US009430145B2

United States Patent
Treskunov et al.

(10) Patent No.: US 9,430,145 B2
(45) Date of Patent: Aug. 30, 2016

(54) DYNAMIC TEXT INPUT USING ON AND ABOVE SURFACE SENSING OF HANDS AND FINGERS

(75) Inventors: Anton Treskunov, Sunnyvale, CA (US); Seung Wook Kim, Cupertino, CA (US); Stefan Marti, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 883 days.

(21) Appl. No.: 13/081,361

(22) Filed: Apr. 6, 2011

(65) Prior Publication Data

US 2012/0260207 A1    Oct. 11, 2012

(51) Int. Cl.
| | | |
|---|---|---|
| *G06F 3/048* | (2013.01) | |
| *G06F 3/0488* | (2013.01) | |
| G06F 3/044 | (2006.01) | |
| G06F 3/023 | (2006.01) | |

(52) U.S. Cl.
CPC ....... *G06F 3/04886* (2013.01); *G06F 3/04883* (2013.01); *G06F 3/0237* (2013.01); *G06F 3/044* (2013.01); *G06F 2203/04808* (2013.01)

(58) Field of Classification Search
CPC . G06F 3/04886; G06F 3/04883; G06F 3/017
USPC .................................................. 715/765, 773
See application file for complete search history.

(56) References Cited

U.S. PATENT DOCUMENTS

| | | | | |
|---|---|---|---|---|
| 4,333,097 A | * | 6/1982 | Buric et al. | 345/168 |
| 5,128,672 A | * | 7/1992 | Kaehler | 341/23 |
| 6,002,390 A | * | 12/1999 | Masui | 345/173 |
| 8,345,008 B2 | * | 1/2013 | Lee et al. | 345/168 |
| 8,358,277 B2 | * | 1/2013 | Mosby et al. | 345/173 |
| 8,484,573 B1 | * | 7/2013 | Zhai et al. | 715/773 |
| 8,487,897 B1 | * | 7/2013 | Hsieh | G06F 3/0237 345/168 |
| 8,502,787 B2 | * | 8/2013 | Rigazio et al. | 345/173 |
| 8,504,934 B1 | * | 8/2013 | Yu | G06F 1/1626 200/5 A |
| 8,508,505 B2 | * | 8/2013 | Shin | G06F 3/0312 341/22 |
| 8,677,287 B2 | * | 3/2014 | Shimotani | G01C 21/3664 345/660 |
| 2003/0048260 A1 | * | 3/2003 | Matusis | G06F 3/0233 345/173 |
| 2004/0183833 A1 | * | 9/2004 | Chua | 345/773 |
| 2004/0252109 A1 | * | 12/2004 | Trent, Jr. | G06F 3/03547 345/174 |
| 2005/0024338 A1 | * | 2/2005 | Ye | G06F 3/0233 345/168 |

(Continued)

OTHER PUBLICATIONS

Microsoft, "Microsoft Surface", http://www.microsoft.com/surface, Sep. 1, 2011.

(Continued)

*Primary Examiner* — William Bashore
*Assistant Examiner* — Nathan Shrewsbury
(74) *Attorney, Agent, or Firm* — Sherman IP LLP; Kenneth L. Sherman; Hemavathy Perumal

(57) ABSTRACT

A virtual keyboard is displayed on a touch screen display surface of a computing device. Partial images of the keyboard are displayed, where a partial image may be one key, referred to as the most probable key that the user will touch, or a group of keys, which may include some less probable or surrounding keys that may be touched. Sensors under or near the display surface detect an outline of the user hands and determines which finger is the fastest moving finger, which is presumed to be the finger used to touch a key. The most probable key is determined based on the fastest moving finger and may be displayed before the finger touches the surface. If the most probable key is not touched, a user profile containing user typing habits may be updated to reflect that a less probable key was touched.

36 Claims, 7 Drawing Sheets

(56) References Cited

U.S. PATENT DOCUMENTS

| | | | |
|---|---|---|---|
| 2005/0104867 A1* | 5/2005 | Westerman et al. | 345/173 |
| 2005/0225538 A1* | 10/2005 | Verhaegh | G06F 3/04886 345/173 |
| 2005/0253807 A1* | 11/2005 | Hohmann | G06F 3/043 345/156 |
| 2006/0053387 A1* | 3/2006 | Ording | 715/773 |
| 2006/0101349 A1* | 5/2006 | Lieberman et al. | 715/773 |
| 2006/0161871 A1* | 7/2006 | Hotelling et al. | 715/863 |
| 2006/0238517 A1* | 10/2006 | King | G06F 1/1626 345/173 |
| 2006/0238522 A1* | 10/2006 | Westerman et al. | 345/173 |
| 2007/0252818 A1* | 11/2007 | Zlotnicki | G06F 3/0237 345/169 |
| 2007/0259717 A1* | 11/2007 | Mattice | A63F 3/00157 463/36 |
| 2008/0018604 A1* | 1/2008 | Paun | H03K 17/962 345/168 |
| 2008/0042985 A1* | 2/2008 | Katsuhito | G06F 3/044 345/173 |
| 2008/0048878 A1* | 2/2008 | Boillot | 340/686.1 |
| 2008/0055259 A1* | 3/2008 | Plocher | 345/173 |
| 2008/0192024 A1* | 8/2008 | Mita | G06F 3/044 345/173 |
| 2008/0259053 A1* | 10/2008 | Newton | G06F 3/0421 345/175 |
| 2009/0237361 A1* | 9/2009 | Mosby | G06F 3/04883 345/173 |
| 2009/0251439 A1* | 10/2009 | Westerman et al. | 345/175 |
| 2009/0303200 A1* | 12/2009 | Grad | 345/173 |
| 2010/0251161 A1* | 9/2010 | Fong et al. | 715/773 |
| 2011/0074685 A1* | 3/2011 | Causey et al. | 345/168 |
| 2011/0078613 A1* | 3/2011 | Bangalore | G06F 3/04886 715/773 |
| 2011/0202876 A1* | 8/2011 | Badger et al. | 715/816 |
| 2011/0234639 A1* | 9/2011 | Shimotani et al. | 345/661 |
| 2011/0261058 A1* | 10/2011 | Luo | G06F 1/1626 345/441 |
| 2011/0320969 A1* | 12/2011 | Hwang | G06F 1/1626 715/765 |
| 2012/0001845 A1* | 1/2012 | Lee | G06F 1/1673 345/156 |
| 2012/0036469 A1* | 2/2012 | Suraqui | 715/773 |
| 2012/0047454 A1* | 2/2012 | Harte | 715/773 |
| 2012/0200508 A1* | 8/2012 | Merrett | 345/173 |
| 2012/0223889 A1* | 9/2012 | Medlock et al. | 345/168 |
| 2012/0235917 A1* | 9/2012 | Miron | G06F 3/04886 345/168 |
| 2012/0326961 A1* | 12/2012 | Bromer | 345/156 |
| 2013/0127729 A1* | 5/2013 | Mosby et al. | 345/168 |
| 2013/0147761 A1* | 6/2013 | Westerman | G06F 3/0235 345/174 |
| 2013/0154982 A1* | 6/2013 | Hotelling | G06F 3/0485 345/173 |
| 2013/0155070 A1* | 6/2013 | Luo | G06T 11/20 345/441 |
| 2013/0167064 A1* | 6/2013 | Amsterdam et al. | 715/773 |

OTHER PUBLICATIONS

Celluon, "A Revolution in Mobile Input Technology, It Virtually Goes Wherever You Do", http://celluon.com/products/laserkey, Sep. 1, 2011.

Terajima et al., "Fast Finger Tracking System for In-Air Typing Interface", CHI 2009—Spotlight on Works in Progress, Session 1, Boston, MA, Apr. 4-9, 2009.

* cited by examiner

DYNAMIC TEXT INPUT USING ON AND ABOVE SURFACE SENSING OF HANDS AND FINGERS

TECHNICAL FIELD

The present invention relates generally to computer hardware and software. More specifically, it relates to data entry systems, virtual keyboards, and various types of display surfaces.

BACKGROUND OF THE INVENTION

Touch screen displays have become increasingly common, particularly on smart phone and tablet computing devices, but they are also being used on larger spaces, such as table tops, white boards, and other surfaces in both public and private settings. The space on such displays is often limited and should be used efficiently. Large displays, such as interactive tabletop displays and smaller ones, such as tablets, are in need of an efficient and convenient text entry method.

New technologies where a display acts as a visual sensor detecting hands and fingers above the surface enable a new input method are now available. On larger surfaces, the keyboard may be at one location and the user may want to enter text at a different location. If there are multiple users using a table top, touch screen surface, such as MS Surface from Microsoft Corporation, then multiple keyboards may become an issue if they start taking up too much space on the surface.

While there are some virtual keyboards, any touch screen surface where a virtual keyboard can be implemented may give rise to the problems mentioned above as well as other issues, such as ergonomic issues. The virtual keyboard may also appear centered horizontally over a text input field and vertically along bottom part of the surface device. The first key press defines the layout; keyboard does not follow finger. Many people are able to touch type and use muscle memory where their movements are repetitive and predictable. It would be desirable to take advantage of a user's muscle memory, since users often do not look at keyboards or even at screens. Also, physical keyboards are expensive and often difficult to maintain, especially public ones.

SUMMARY OF THE INVENTION

General aspects of the invention include, but are not limited to methods, systems, apparatus, and computer-readable media for enabling message transmission in multimedia device networks.

One aspect of the present invention is a method of implementing a virtual keyboard in a computing system having a touch screen display. A user places his hands above the display and one or more sensors below or near the display detects the user hands. The system tracks finger movements above the display surface. Initially, there may not be any significant movement, until the user starts typing, at which point there is likely a finger that moves the fastest. The system determines which finger is the fastest moving finger. It uses this data to determine a keyboard key that the user is most likely going to touch or type, referred to as a most probable key, with the fastest moving finger. The system detects contact on the touch screen display by the fastest moving finger.

In one embodiment, it is determined whether the fastest moving finger touches a key that is not the most probable key, referred to as a less probable key. Based on this determination, the system is updated to reflect that a less probable key was touched. In this manner, the user typing habits may be used to modify the virtual keyboard. The user typing-related historical data or statistics data is stored and used to adjust the position and size of the keys of the virtual keyboard on the display surface. In one embodiment, the most probable key is displayed on the display surface before the fastest moving finger touches the display surface. Multiple less probable keys may also be displayed before the fastest moving finger touches the surface. In one embodiment, the user registers or logs in with the system implementing the virtual keyboard and a user typing profile is retrieved.

Another aspect of the invention is a method of entering text using a virtual keyboard. The hands and fingertips of the user (the person typing or entering the text) are outlined. The keyboard size and position on the display surface are determined. The user's fingertips are identified and a fastest moving finger is determined. Once this finger has been determined, a portion of the virtual keyboard is shown on the display surface, where the portion that is shown is determined based on the fastest moving finger.

In another aspect of the present invention, a computing system for implementing a virtual keyboard having a touch screen display is described. Such a system may be a tablet computing device, a computing system fashioned as a table or part of a wall having a comparatively larger touch screen display that one or more users can type on using virtual keyboards at the same time. The system has a process and, as mentioned, a touch screen display. A sensor is used to track hands, fingers, and fingertips that are above the display. In one embodiment, the sensor is under or near the display positioned in a manner that allows them to detect movements above the display. A memory in the computing system stores various types of data and software related to implementing a virtual keyboard. Certain types of data may include user typing profiles and predetermined key position data that reflects the position of keys in a standard QWERTY keyboard. Certain types of software may include a key determination module for determining the fastest moving finger and, in one embodiment, a finger speed detection module for measuring the speed of the fastest moving finger. In another embodiment, the memory may also store a statistics module for processing data on which key of the virtual keyboard was touched if a most probable key was not touched and updating a user typing-related profile.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE INVENTION

Figure 1:
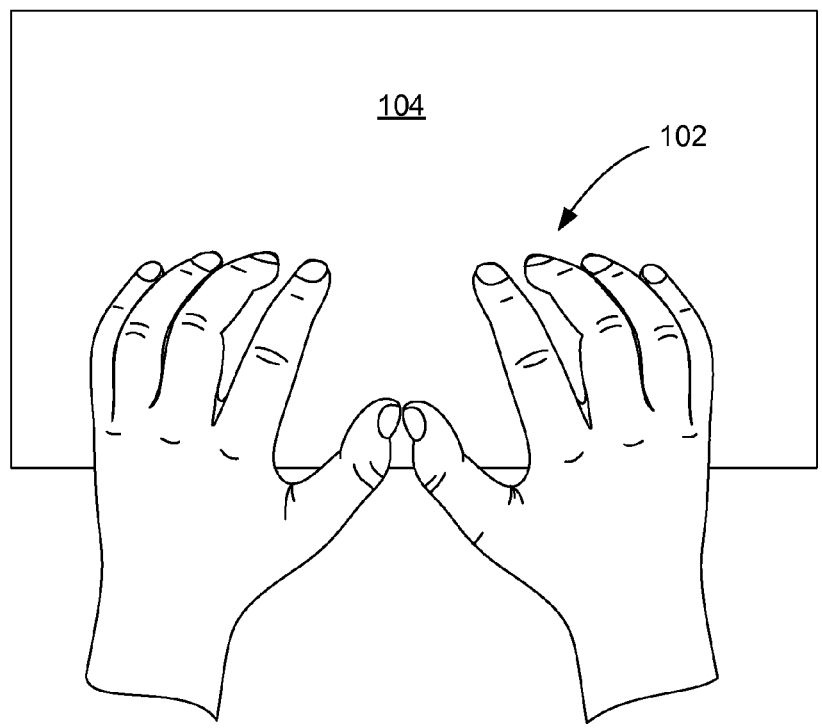
FIG. 1 is a top view diagram showing a pair of hands over a touch screen display surface.

With respect to touch screen displays, technology currently is available where a hand, fingers, or other objects that are hovering or above the surface can be detected using cameras located under the surface (tracks hands above display surface). By observing the typist's hands from below (i.e., from perspective from display itself), the system may predict which letter may be typed next. In this manner, displaying a full virtual keyboard is not necessary anymore. A technology known as wedge optics provide such sensors. Another technology involves a semi-transparent tabletop display with video cameras underneath the display facing up. There is also pixel-sensing technology. These types of technologies can be used to detect and outline a user's hand, fingers, and fingertips above the display surface (there are distance restrictions, but none of which impede the present invention).

Touch screen displays are appearing in public and private environments. The user puts his hands over the surface. The user may be placing them in a typing position, but without any of the fingers touching the surface. The shape of the hands is detected and the fingers may be outlined. For example, the sensors may detect the pattern of one or more hands and fingers. The software may initialize once it detects the outline of the user's hands.

The user starts to move a finger to type a letter. The hand and finger configuration is used to determine what is referred to as the "most probable key" that the user is likely to hit. Once the most probable key is determined, the system stores the value in memory. In addition, the surrounding keys may also be stored. This may range from one to about 16 keys. The surrounding keys of a particular key are pre-determined or fixed, given the key layout of the QWERTY keyboard does not change, and are associated with the particular key.

If the user's touch input action is ambiguous, the system may display a small section of the keyboard just under the hand or, more specifically, under the finger that is typing, consisting of the key that is about to be "hit" as well as several neighboring keys, giving the typist an opportunity to correct herself or let the system decide the key most likely to be hit.

Various embodiments utilize information about the position of the hands and fingers hovering above the display with information about where the fastest moving finger touches the display. Keyboard key recognition (typing recognition) is optimized with these two sources of information over time, adjusting to user preferences.

Once the most probable key is identified, it may be displayed on the touch screen surface. The surrounding keys may also be displayed in a less prominent manner, for example, less bolder or smaller in size. The configuration of the keys may be displayed in a standard manner (e.g., the display may be size of a conventional physical keyboard), but can change to reflect user's typing habits over time. The layout of the keyboard and the size of the keys can be adjusted. The key may be displayed before and after the user touches the particular key.

If the user hits one of the surrounding keys instead of the most probable key, the system keeps track of this action; that is, hitting one of the less probable keys and may be used to update the user typing profile via a background processor. The system may use statistics data to change the configuration of the keyboard. Statistics about finger and hand postures may be gathered for each user and may be used to adapt to the user's preferred keyboard size.

Even though the keyboard is co-located with visual display, it minimizes the amount of display space utilized (and as a result content that may be blocked or obscured) since only a few keys or one is displayed at any point. This saves power as well.

The text entry or keyboard is position independent. The user can start typing anywhere on the surface and the input area may follow the user's hand, dynamically adjusting to the hand position. A partial virtual keyboard may be displayed. This may help with ambiguous text input. Visual feedback may be provided which allows the user to correct which key she is about to press.

Methods and systems for implementing a virtual keyboard on a touch screen surface are described in the various figures. FIG. 1 is a top view diagram showing a pair of hands over a touch screen display surface. A pair of user hands 102 is hovering above a surface 104 and in a position and configuration where the user is ready to begin typing on a virtual keyboard (not shown) in the area generally beneath hands 102. The user can place her hands at any distance from the edge of surface 104. In the described embodiment, touch screen display surface 104 is a table top and FIG. 1 shows only a portion of the table surface. In other embodiments, surface 104 may be a display of a tablet computer or other display surface where a user can comfortably or naturally place her hands over and begin typing. Generally such a surface is horizontal although it can be a slight incline. As described below, the display surface or table has certain hand and finger tracking capabilities in that there may be sensors or optical capabilities that enable the perspective of looking up from display surface 104. For example, a technology known as wedge optics, demonstrated by Microsoft Applied Sciences Group, can be used to track hands over a display surface. Microsoft Surface is a commercially available touch screen surface device available from Microsoft Corp. of Redmond, Wash.

FIGS. 2A to 2D are top view diagrams illustrating different virtual keyboard displays that may be shown when a user begins typing in accordance with various embodiments of the present invention. A user places her hands over surface 104 as shown in FIG. 1. As described in detail below, when a finger begins moving downward at a speed faster than the other fingers (which are generally still), one or more keys or, in some cases, no keys, may be displayed on surface 104.

Figure 2A:
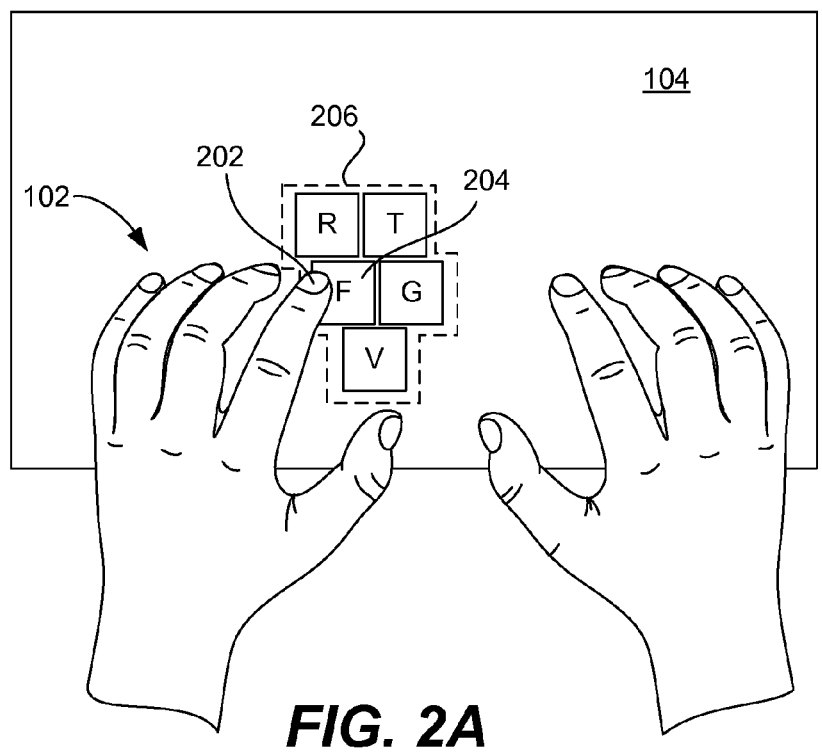
FIGS. 2A to 2C show various embodiments of a partial virtual keyboard display when the user moves certain fingers downward.

FIG. 2A shows one embodiment of a partial virtual keyboard display when the user moves left index finger 202 downward. In the described embodiment, lateral or upward movement of fingers does not trigger the operations of displaying or activating the virtual keyboard. It is only the downward movement of a finger that will do so. Before the user starts typing and touches surface 104 with a finger, a particular key 204, is displayed. In the described embodiment, the internal operations, this key is referred to as the most probable key. In this example, it is the F key. How this key is determined is described below. Other surrounding keys, which may be referred to as less probable keys, may also be displayed, shown collectively as keys 206. They are keys for letters R, T, G, and V. In the described embodiment, keys 206 may be displayed in a less prominent manner than most probable key 204. For example, they may be dimmer or smaller than the display of key 204. Less probable keys 206 may also consist of fewer keys, for example, they may include only keys for letters R and V. They may also consist of more keys, such as all the keys on the left side of the virtual keyboard. The specific number can vary depending on the design choices, the environment, and the type of users expected.

Figure 2B:
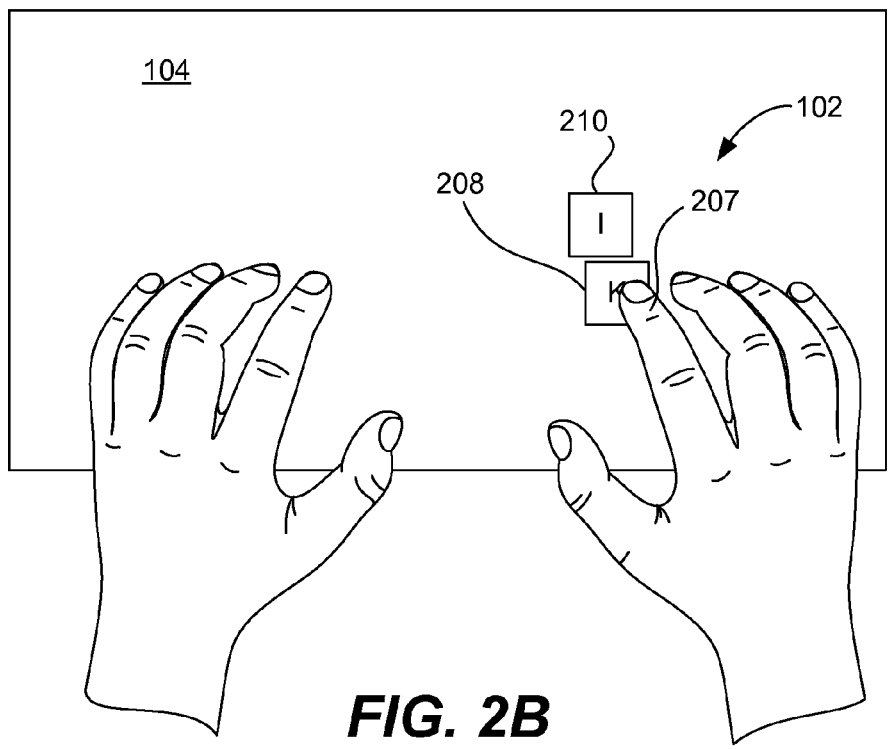
Figure 2C:
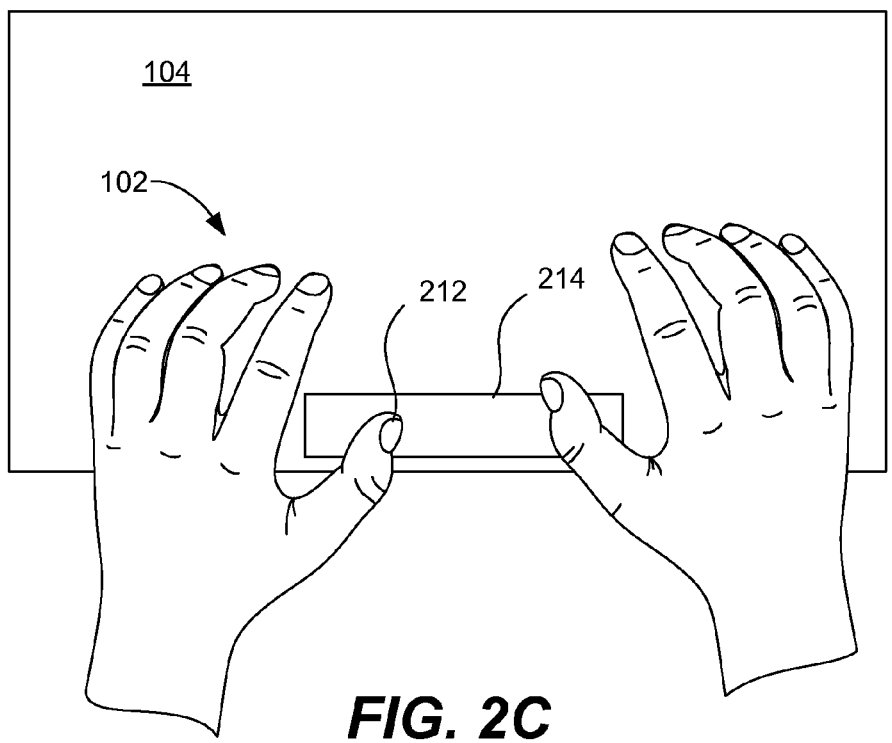

In FIG. 2B, the right hand middle finger 207 is moving downward and the key for the letter K is displayed as a most probable key 208 on the virtual keyboard before finger 207 touches display 104. A less probable key 210 for the letter I is also displayed. As noted, more keys may be displayed or no keys. The size of the keys (i.e., the size of the overall keyboard) may also vary depending on the context in which the virtual keyboard is being used. FIG. 2C shows another example of a virtual keyboard display. The user's left thumb 212 moves downward presses the spacebar key which is determined to be a most probable key 214 and is the only key that is displayed. In another embodiment, no keys are displayed when the user touches surface 104. For example, the user may be an experienced virtual keyboard user and may not need to see the keys displayed because the system has been trained to accurately anticipate or know her typing habits and is able to accurately predict the key she will hit when her finger moves down and before it hits surface 104. In other cases, as noted, only the most probable key may be displayed. If the user hits the most probable key, but had intended to hit a surrounding key and goes back to correct it, the system can incorporate this knowledge to make the typing on the virtual keyboard more accurate for that user.

It should be noted that the user may begin typing anywhere on display surface 104. The virtual keyboard may be displayed anywhere on surface 104. In some cases, such as on tablets, there may only be space to display it one or two ways. There may also be multiple users using multiple virtual keyboards at different locations around display surface 104. Each user can type on a separate virtual keyboard while others are typing on the same display surface 104. In one embodiment, the system may not allow two virtual keyboards to overlap. That is, if the keyboards were fully or partially displayed, keys from each one may not occupy the same display space on surface 104.

Figure 3A:
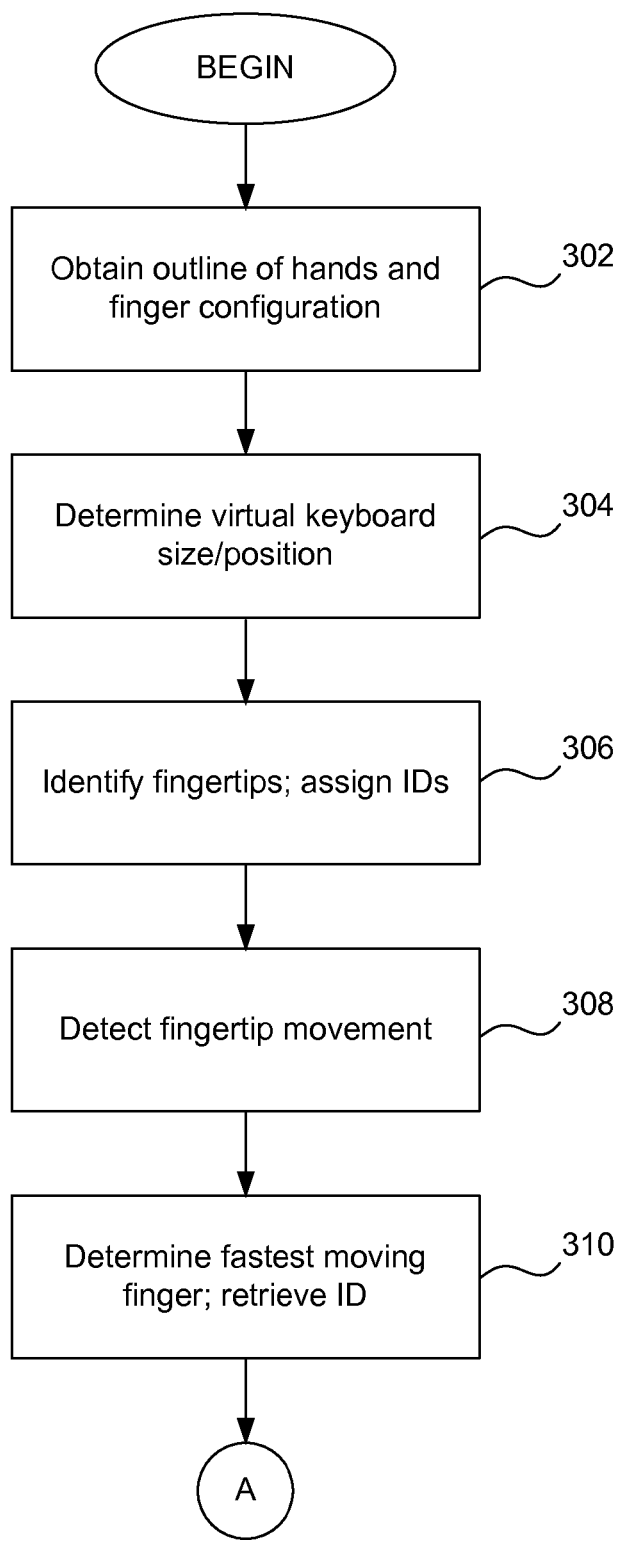
FIG. 3 is a flow diagram of a process of implementing a virtual keyboard in accordance with one embodiment of the present invention.
Figure 3B:
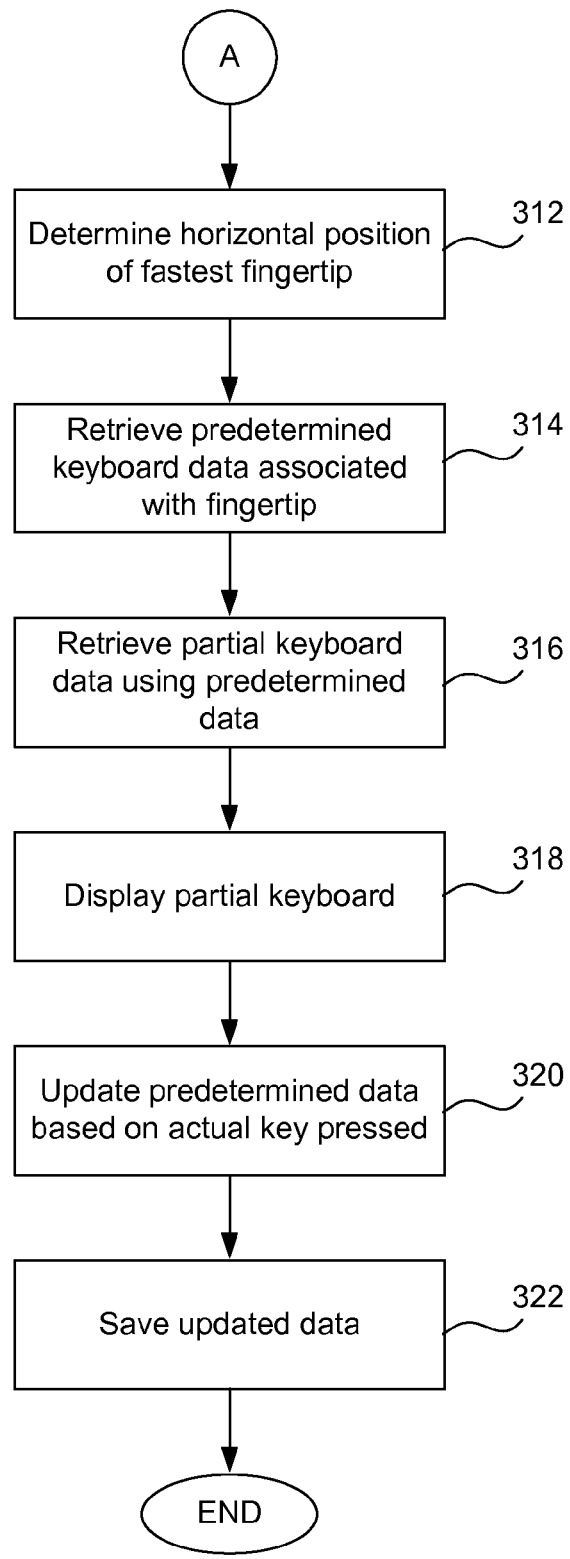

FIG. 3 is a flow diagram of a process of implementing a virtual keyboard in accordance with one embodiment of the present invention. Before the process begins, power for the computing system including the display surface has been turned on and the sensors for detecting hand and finger movement are functioning. The user (the person who will be typing) has placed her hands over the surface and is ready to enter data into the system using the virtual keyboard. As noted above, the surface on which the user will begin typing may be a table surface, where part of or the entire table top is a touch screen display, or a smaller surface, such as a portable tablet PC, to mention only two examples. At step 302 the sensors obtain an outline of the user's hands as she places them above the display (typing surface) in a typing-ready position. At generally the same time, or soon after the outline of hands is obtained, the user's finger configuration is obtained by the same sensors. At step 302 the outline of the hands is one set of data that may be referred to as hand outline data and the finger configuration may be seen as a separate set of data. The hand outline data and finger configuration data may be determined by the type of sensors used. In one embodiment, they may both be in the same data set, referred to as hands outline data. Further detection or identification of the fingers, specifically, the fingertips is performed, as described below.

At step 304 the system determines a size and position of the keyboard to be displayed on the surface. That is, how big the keyboard should be and where it should be displayed on the surface. This keyboard display is a virtual keyboard in that it is not a physical keyboard but an image of a functional keyboard on the display which is displayed only when needed. The size and position of the keyboard may be determined, in large part, from examining the hand and finger outline data from the previous step. By using this data, a software module in the system determines an optimal size of the keyboard given the size and configuration of the user's hands and fingers. It also determines where on the display surface the virtual keyboard should be displayed. In another embodiment that may be less computational, a standard size keyboard may be used for all hand and finger sizes. The position of the keyboard is still determined and displayed based on the user's hand position. The goal being that if the display surface is large, like a table surface, the user can sit anywhere around the table display, put her hands over the surface and be able to type comfortably. Once the keyboard size, orientation, and position have been determined, the corresponding data is saved in system memory. In one embodiment, the data may be organized by storing data for the left half of the keyboard in one file or as one data set and data for the right half of the keyboard in another file or data set.

At step 306 sensors identify the user's fingertips. Commercially available sensors, such as high-frame rate cameras from Artray of Tokyo, Japan or Point Grey of Richmond, Canada, are able to perform this function. Each fingertip is assigned an identifier which is stored in memory. These identifiers should be unique for each fingertip and can have any suitable format as selected by the system designer. Along with the identifier, the position of each fingertip and the radius or size may also be stored. The radius size may be in millimeters, centimeters, inches, and the like. Proprietary unit of measurement may also be used. For example, a unit may be 5 millimeters, and a fingertip may be 10 or 12 units in size. The same sensors used for obtaining the outline of the hands and finger configuration may also be used for measuring the size of the fingertips. The position data may be a Cartesian (x,y) coordinate indicating a position on the display surface directly above which a fingertip is positioned, where the display surface is referenced as a horizontal plane. This may be described as an absolute position of the fingertip on the display surface. In another embodiment, a z coordinate to measure the distance of the fingertip above the surface may also be determined. However, this may be computationally intensive and is not needed for displaying a virtual keyboard. The display surface may be stored internally as a two-dimensional Cartesian graph and any point on the surface may be identified by an x and y pair. Thus, in one embodiment, each fingertip may have an ID, position data, and size (radius) data.

At step 308 the sensors detect fingertip movement. Initially, before the user begins typing and has her hands above the typing surface, there is typically some minor or slight movement of the fingers and hands. Speed data reflecting this slight movement may be saved by the system. Once the user starts typing, there is significantly more movement in one of the fingers, specifically, a fast downward movement.

At step 310, the sensors detect that there is fast downward movement of one of the fingertips. Typically, users move one finger at a time when typing. Once identified, the ID for the fastest fingertip is retrieved from memory. It is this finger ID of the selected finger that is used for further processing.

At step 312 the system determines the horizontal position of the selected fingertip. In one embodiment, this horizontal position is position data of the fingertip relative to the initial horizontal position of the other fingertips. This relative position may be described as the position of the selected fingertip on the QWERTY grid relative to its default position in the hand coordinate system. The hand coordinate system may be described as the virtual QWERTY keyboard as a grid or coordinate system. Generally, the relative position may be described as, for example, 1 key up, 2 keys down, 1 key to the left or to the right, and so on. These describe the position of the selected fingertip with respect to its default position, or the key that it would press if it came straight down. It is the coordinate of the finger at step 306, where the fingertips are identified and assigned IDs and position coordinates. It may also be described as the position of the fastest moving fingertip relative to the other fingers. The data produced by this step may be fingertip offset data normalized by fingertip size. As noted above, the offset data may be generally characterized as the number of keys up, down, left, or right from a center/default key. This data may be normalized by the actual size of the fingertip. For example, a smaller than typical fingertip may mean a smaller offset (e.g., 1 key up), whereas a larger size may mean a larger offset (e.g., 2 keys up) from the default.

At step 314 the system retrieves predetermined virtual keyboard data associated with the fastest or selected fingertip. In one embodiment, each finger has associated keyboard data which consists of one key. As noted above, this key is referred to as the most probable key. It may consist of a character and a coordinate. For example, if the fastest moving fingertip is the left middle finger, the predetermined data that is retrieved from memory may be the key for the letter D and its x,y coordinate. In other embodiments, only the coordinate or position data of the most probable key is retrieved. This is the key that the system believes is the one the fastest moving finger is likely to press when the fingertip touches the display surface.

In one embodiment, the system may be trained to adjust which key will be the most probable key by taking into account the typist's typing habits. For this learning function, the system maintains a database containing statistical data about user's previous typing and corrections. For example, maybe the D key is not the most probable key that will be hit when the user's left middle finger is moving downward. Based on history and statistics for this user, maybe the most probably key should be the key C (immediately below the D key) or the E key (above D). Details on this process are described further in FIG. 4.

At step 316 partial keyboard data is retrieved using the predetermined data, which in one embodiment is the most probable key determined at step 314. In one embodiment, this data may consist of the most probable key and the surrounding keys in the half of the keyboard containing the most probable key. The size and positions of the surrounding keys are determined by the standard QWERTY layout or a custom layout preselected by the user. The surrounding keys (less probable keys) are predetermined for each key. That is, each key has a set of surrounding keys as shown in the figures. The number of surrounding keys may vary from one or two keys up to 16 keys, for example, an entire half of the key in which the most probable key is in. In the example above, it may be the entire left half of the keyboard.

At step 318 the partial keyboard data is displayed on the touch screen surface. In one embodiment, the display consists of the most probable key and the surrounding keys. As noted above, in other embodiments, it may consist of only the most probable key. The number of surrounding keys that is displayed may depend on the user's experience level. A new user (or one that has not registered with the system and for whom the system does not have any typing history data) may have all surrounding keys displayed, such as an entire half of a keyboard. An experienced user may have only the most probable key displayed.

As noted above, the most probable key may be more prominent, such as bolded, highlighted, or larger in size than the surrounding keys, if any are part of the partial data. It is also possible that no partial data is actually displayed. This may be preferred for an experienced user who does not need to see the keys (and relies heavily on muscle memory) and may be using a battery-operated tablet or computing device and wants to save power. The selected finger touches the surface of the display. If the finger hits the most probable key, then the system made the correct estimate as to which key the user was going to hit based on the factors described above and no modification or learning needs to be done by the system. If any data is saved, that data may reflect or confirm that the most probable key that was determined (at steps 314 to 318) was, in fact, correct.

At step 320 the predetermined data stored in the system memory may be modified if the user did not touch the most probable key and instead hit one of the surrounding keys. This fact is processed by the system to make adjustments to the predetermined data and the partial data for that particular user. In one embodiment, in order for the learning and statistics feature to have significance, the user registers with the system so that a user profile can be created. Thus, at step 320 the predetermined data is updated based on the actual key selected by the user or if the user hit a key and went back to correct it. The statistical data for the user is updated if the user has a profile.

Immediately after the user touches the key on the virtual keyboard, control returns to step 308 where fingertip movement is detected and the process repeats. The process repeats for each key pressed. Updating the statistical database and modifying the predetermined data and the partial data may occur as background processes while the user is typing.

Figure 4:
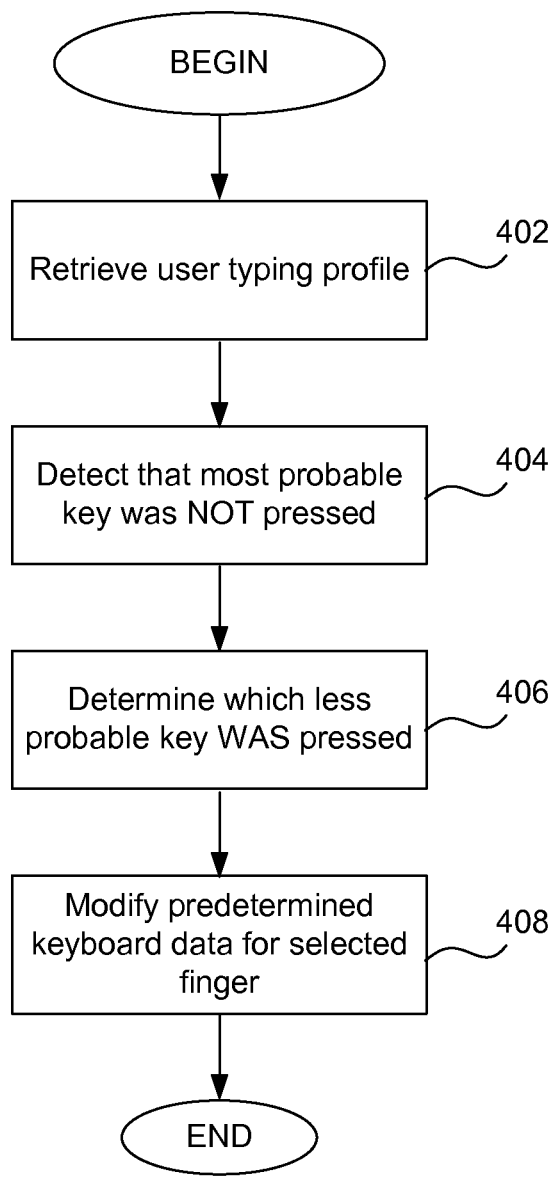
FIG. 4 is a flow diagram showing in some more detail a process of updating the statistical data when the user hits a surrounding key in accordance with one embodiment of the present invention.

FIG. 4 is a flow diagram showing in some more detail a process of updating the statistical data when the user hits a surrounding key in accordance with one embodiment of the present invention. The process may be described as a user profile updating and system learning process. However, the system may still learn from unregistered users who do not have a profile. For example, if a sufficiently high number of people hit a specific surrounding key when the system anticipates that they will hit another key, i.e., the most probable key, then the system can modify its predetermined data and other statistical data to reflect that.

At step 402 the system retrieves a user typing profile after the user registers with the system. The registration may be done in a number of conventional ways, such as logging in, doing a face scan or eye scan, and other methods. In other embodiments, the user does not have to register and does not have to have a user profile. However, in the described embodiment, a user profile is retrieved and is updated based on the key that the user actually pressed. The user profile contains data reflecting the user's typing habits and other ergonomic data about how the user types, specifically about the user's finger and fingertip movement when typing, plus preferred keyboard and key size.

The process then picks up when the system detects that the most probable key was not pressed and that one of the surrounding keys was pressed instead at step 404. At step 406 the system obtains data on which key was actually pressed. That is, the system was expecting that the D key would be pressed but instead the C key was pressed. This fact is processed and the predetermined keyboard data for the D key and the C key are modified, effectively shifting the virtual keyboard layout. Generally, the predetermined keyboard data for the selected finger is modified and stored in memory. If this occurs a sufficient number of times for the user, then the next time the user's selected finger is configured in the same position, the partial keyboard data (most probable key plus surrounding keys) will have the C key as the most probable key and the D key will be one of the surrounding keys. This will be part of the user's typing profile and the process is complete. It can repeat as many times as necessary whenever the user essentially hits a key that the system did not anticipate as being the most probable key.

Figure 5:
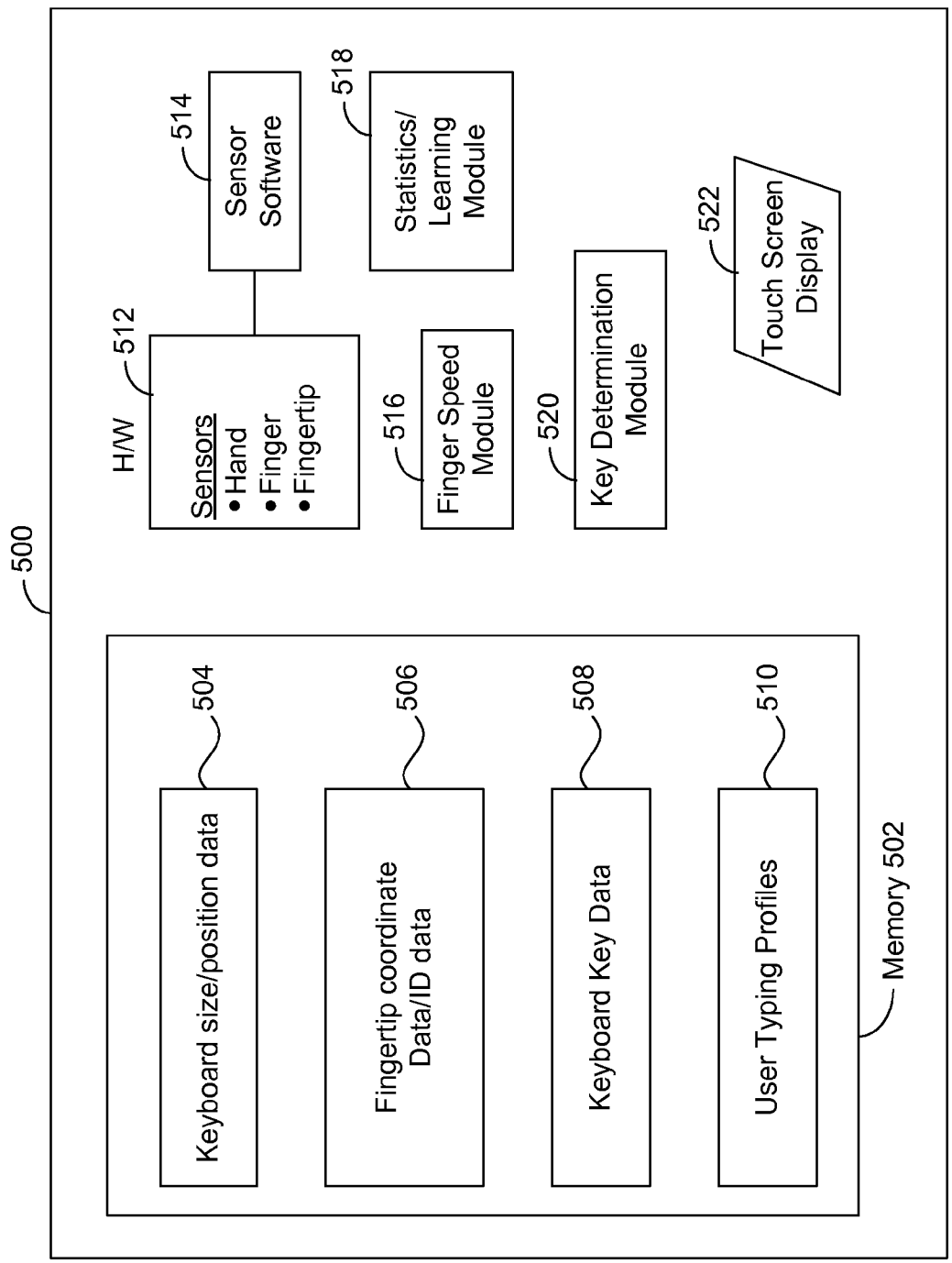
FIG. 5 is a system block diagram of a computing system having a touch screen display and a virtual keyboard in accordance with one embodiment of the present invention.
Figure 6A:
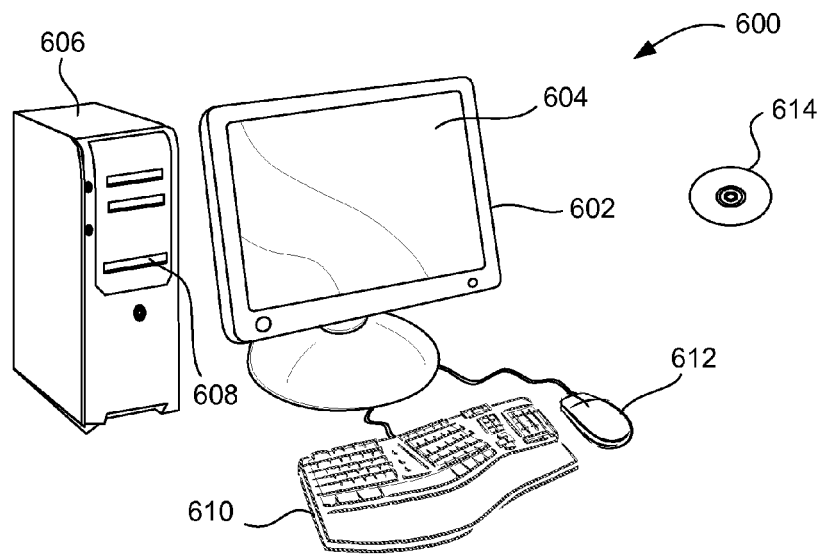
FIGS. 6A and 6B are diagrams of a computing device suitable for implementing embodiments of the present invention.
Figure 6B:
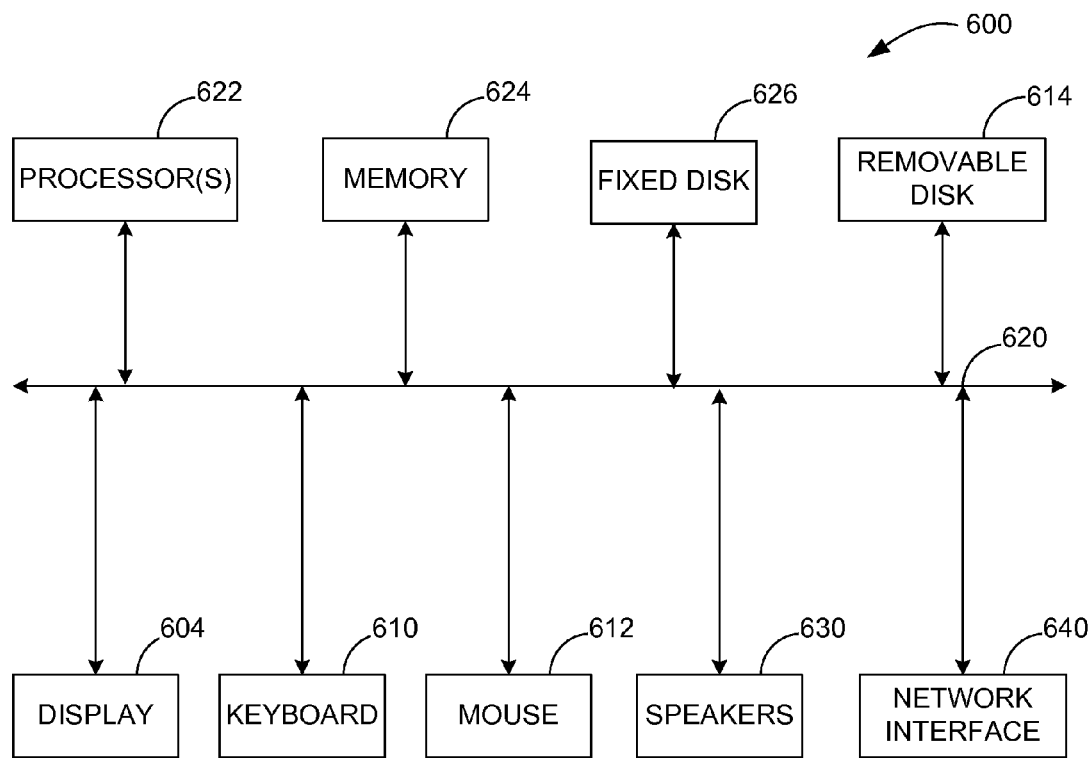

FIG. 5 is a system block diagram of a computing system having a touch screen display and a virtual keyboard in accordance with one embodiment of the present invention. The components shown in computing system 500 are specifically relevant to the present invention of implementing a virtual keyboard as a means for entering data using a touch screen surface. FIGS. 6A and 6B, described below, are block diagrams showing other hardware and software components in the computing system.

As described above, there are various types of data utilized in various embodiments. These data are stored in persistent memory 502 in computing system 500. As described in step 302, the system uses and stores virtual keyboard size data and data on the position of the virtual keyboard on the display surface. This data 504 may be in the form of coordinate data (x,y) or any other suitable data units that the system can use to indicate the size and position of the virtual keyboard on the display. Also stored are fingertip coordinate data and fingertip ID data 506. This data is determined at step 306. Also related to the virtual keyboard itself is keyboard key data 508 which includes the predetermined data described above and the partial keyboard data. It contains the predetermined data associated with a selected fingertip (the most probable key data) in the form of a character (key F and the coordinates for that key). It also contains the partial keyboard data associated with the predetermined data, specifically some, one, or all of the surrounding key layouts for the most probable key. Recall that each key may have anywhere from one to about 16 surrounding keys. Also contained in memory 502 are the user typing profiles 510 which can be in any suitable format. As noted, they contain data on the user typing preferences and habits for a particular user.

Also shown in computing system 500 are one or more sensors 512 in or operating in conjunction with the display surface. These sensors may include sensors for detecting hands, fingers, fingertips, finger movement, and the like. Various types of sensors may be used for these functions, as described above. There may also be face tracking sensors and other sensors used for identifying a user. Sensors 512 also have software 514 for controlling and operating the sensors and processing data.

There are also various modules for performing functions specific to the present invention. For example, there may be a module 516 for determining finger speed and which finger is moving downward the fastest. The raw data for this will come from the sensors 512, but module 516 may be used for determining the fastest finger. Another module 518 may be used for collecting and processing statistical data with respect to the user's typing habits and using the statistical data to improve the system's ability to determine the most probable key. Another module that may be used is module 520 to determine the most probable key based on the user's finger movement, orientation, fingertip size, and other data as described above. The system also has a touch screen display 522 which is used to implement the virtual keyboard and that the user uses to enter data into the system. Various types of touch screen technology may be used, however, some may be more suitable depending on the type of sensors 512 used to tracks hands and fingers above the surface.

As noted above, the computing system may be, for example, a tablet computer or a surface computer device. FIGS. 6A and 6B illustrate a computing system 600 suitable for implementing specific embodiments of the present invention. FIG. 6A shows one possible physical implementation of a computing system, such as surface computer device. In one embodiment, system 600 includes a display 604. It may also have a keyboard 610 that is shown on display 604 (i.e., a virtual keyboard) or may be a physical component that is part of the device housing. It may have various ports such as HDMI or USB ports (not shown). Computer-readable media that may be coupled to device 600 may include USB memory devices and various types of memory chips, sticks, and cards.

FIG. 6B is an example of a block diagram for computing system 600. Attached to system bus 620 is a variety of subsystems. Processor(s) 622 are coupled to storage devices including memory 624. Memory 624 may include random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to processor 622; it provides additional data storage capacity and may also include any of the computer-readable media described below. Fixed disk 626 may be used to store programs, data and the like and is typically a secondary storage medium that is slower than primary storage. It will be appreciated that the information retained within fixed disk 626, may, in appropriate cases, be incorporated in standard fashion as virtual memory in memory 624.

Processor 622 is also coupled to a variety of input/output devices such as display 604 and network interface 640. In general, an input/output device may be any of: video displays, keyboards, microphones, touch-sensitive displays, tablets, styluses, voice or handwriting recognizers, biometrics readers, or other devices. Processor 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon processor 622 or may execute over a network such as the Internet in conjunction with a remote processor that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What we claim is:

1. A method of implementing a virtual keyboard, the method comprising:
    detecting a hand above a display surface;
    tracking at least one finger movement of at least one finger of the hand before the at least one finger touches the display surface;
    determining a fastest moving finger of the at least one finger;
    retrieving predetermined key configuration data corresponding to the fastest moving finger;
    determining, based on the predetermined key configuration data corresponding to the fastest moving finger, a most probable key that the fastest moving finger is likely to touch before the fastest moving finger touches the display surface;
    adjusting the display surface by displaying one or more virtual keys on the display surface before the fastest moving finger touches the display surface, wherein the one or more virtual keys displayed includes the most probable key;
    detecting contact on the display surface by the fastest moving finger; and
    selectively updating the predetermined key configuration data corresponding to the fastest moving finger based on the contact detected;
    wherein the predetermined key configuration data corresponding to the fastest moving finger is updated in response to the fastest moving finger touching a different virtual key than the most probable key; and
    wherein each finger has corresponding predetermined key configuration data comprising information relating to a most probable key that the finger is likely to touch.

2. The method of claim 1, further comprising:
    tracking at least one downward finger movement of at least one finger of the hand before the at least one finger touches the display surface;
    determining whether the fastest moving finger touches a less probable key instead of the most probable key; and
    selectively updating a user typing profile including data representing one or more user typing habits based on the contact detected, wherein the user typing profile is updated to incorporate data that the less probable key was touched in response to determining that the fastest moving finger touched the less probable key, thereby using the one or more user typing habits to modify the virtual keyboard;
    wherein the virtual keyboard is displayable anywhere on the display surface.

3. The method of claim 1, wherein selectively updating the predetermined key configuration data corresponding to the fastest moving finger based on the contact detected comprises:
    determining whether the fastest moving finger touches a less probable key instead of the most probable key; and
    updating the predetermined key configuration data corresponding to the fastest moving finger in response to determining that the fastest moving finger touched the less probable key to incorporate data that the less probable key was touched.

4. The method of claim 1, further comprising:
    storing user typing historical data; and
    adjusting position and size of at least one virtual key on the display surface based on the historical data.

5. The method of claim 1, wherein displaying one or more virtual keys on the display surface before the fastest moving finger touches the display surface includes displaying at least one virtual key that is not already displayed on the display surface.

6. The method of claim 1, wherein displaying one or more virtual keys on the display surface before the fastest moving finger touches the display surface includes displaying at least one less probable key.

7. The method of in claim 1, further comprising outlining the hand and one or more fingers of the hand using one or more sensors below the display surface.

8. The method of claim 1, further comprising:
    retrieving a user typing profile, wherein the user typing profile includes data representing one or more user typing habits.

9. The method of claim 1, further comprising:
    storing one or more coordinates associated with one or more fingertips of the hand.

10. The method of claim 1, wherein, for each finger, corresponding predetermined key configuration data comprises at least one of a character and a coordinate relating to a most probable key that the finger is likely to touch.

11. The method of claim 9, further comprising:
    assigning a unique identifier to each fingertip.

12. The method of claim 11, further comprising:
    retrieving an identifier assigned to the fastest moving finger.

13. The method of claim 1, further comprising:
    determining a horizontal position of the fastest moving finger.

14. The method of claim 1, further comprising:
    retrieving partial keyboard data using the predetermined key configuration data corresponding to the fastest moving finger; and
    based on the partial keyboard data retrieved, displaying a partial keyboard including one or more virtual keys on the display surface before the fastest moving finger touches the display surface;
    wherein the partial keyboard minimizes the amount of display space utilized on the display surface; and
    wherein size and position of the partial keyboard is determined based on size and position of the hand.

15. The method of claim 1, further comprising:
determining a most probable key that the fastest moving finger is likely to touch utilizing data related to user typing muscle memory.

16. A method of entering text using a virtual keyboard, the method comprising:
outlining a hand and one or more fingertips of the hand;
determining a keyboard size and a keyboard position on a display surface;
identifying the one or more fingertips of the hand;
tracking at least one finger movement of at least one finger of the hand before the at least one finger touches the display surface;
determining a fastest moving finger of the at least one finger;
retrieving predetermined key configuration data corresponding to the fastest moving finger;
based on the keyboard size, the keyboard position, the fastest moving finger and the predetermined key configuration data corresponding to the fastest moving finger, displaying a partial virtual keyboard on the display surface before the fastest moving finger touches the display surface, wherein the partial virtual keyboard displayed includes a most probable key that the fastest moving finger is likely to touch before the fastest moving finger touches the display surface;
detecting contact on the display surface by the fastest moving finger; and
selectively updating the predetermined key configuration data corresponding to the fastest moving finger based on the contact detected;
wherein the predetermined key configuration data corresponding to the fastest moving finger is updated in response to the fastest moving finger touching a different virtual key than the most probable key; and
wherein each finger has corresponding predetermined key configuration data comprising information relating to a most probable key that the finger is likely to touch.

17. The method of claim 16, further comprising:
tracking at least one downward finger movement of at least one finger of the hand before the at least one finger touches the display surface.

18. The method of claim 17, further comprising:
determining whether the fastest moving finger touches a less probable key instead of the most probable key; and
selectively updating a user typing profile including data representing one or more user typing habits based on the contact detected, wherein the user typing profile is updated to incorporate data that the less probable key was touched in response to determining that the fastest moving finger touched the less probable key, thereby using the one or more user typing habits to modify the virtual keyboard.

19. The method of claim 17, wherein selectively updating the predetermined key configuration data corresponding to the fastest moving finger based on the contact detected comprises:
determining whether the fastest moving finger touches a less probable key instead of the most probable key; and
updating the predetermined key configuration data corresponding to the fastest moving finger in response to determining that the fastest moving finger touched the less probable key to incorporate data that the less probable key was touched.

20. The method of claim 16, further comprising:
storing user typing historical data; and
adjusting the keyboard size and the keyboard position based on the historical data.

21. The method of claim 17, wherein the partial virtual keyboard displayed includes at least one virtual key that is not already displayed on the display surface.

22. The method of claim 16, wherein the partial virtual keyboard displayed further includes one or more less probable keys.

23. The method of claim 16, wherein one or more sensors below the display surface are used for outlining the hand and the one or more fingertips of the hand.

24. The method of claim 16, further comprising:
retrieving a user typing profile, wherein the user typing profile includes data representing one or more user typing habits.

25. The method of claim 17, wherein, for each finger, corresponding predetermined key configuration data comprises at least one of a character and a coordinate relating to a most probable key that the finger is likely to touch.

26. The method of claim 25, further comprising:
retrieving partial keyboard data using the predetermined key configuration data corresponding to the fastest moving finger;
wherein the partial keyboard is further based on the partial keyboard data retrieved; and
wherein the partial keyboard minimizes the amount of display space utilized on the display surface.

27. The method of claim 16, further comprising:
assigning a unique identifier to each fingertip.

28. The method of claim 17, further comprising:
determining a most probable key that the fastest moving finger is likely to touch utilizing data related to user typing muscle memory.

29. A computing system for implementing a virtual keyboard, the system comprising:
a processor;
a touch screen display;
a sensor configured to track a hand and one or more fingers of the hand above the touch screen display; and
a data storage device storing instructions that when executed by the processor causes the processor to m operations including:
storing one or more user typing profiles and predetermined key position data for the one or more fingers of the hand, wherein each finger has corresponding predetermined key configuration data comprising information relating to a most probable key that the finger is likely to touch;
determining a fastest moving finger of the hand based on at least one finger movement of at least one finger of the hand before the at least one finger touches the touch screen display;
retrieving predetermined key configuration data corresponding to the fastest moving finger;
determining, based on the predetermined key configuration data corresponding to the fastest moving finger, a most probable key that the fastest moving finger is likely to touch before the fastest moving finger touches the touch screen display;
adjusting the touch screen display by displaying one or more virtual keys on the touch screen display before the fastest moving finger touches the touch screen display, wherein the one or more virtual keys displayed includes the most probable key;

detecting contact on the touch screen display by the fastest moving finger; and selectively updating the predetermined key configuration data corresponding to the fastest moving finger based on the contact detected;

wherein the predetermined key configuration data corresponding to the fastest moving finger is updated in response to the fastest moving finger touching a different virtual key than the most probable key.

30. The system of claim 29, wherein the operations further include:

measure measuring a finger speed of the fastest moving finger.

31. The system of claim 29, wherein the operations further include:

processing data on which key of the virtual keyboard was touched in response to determining that the most probable key was not touched; and selectively updating a user typing profile including data representing one or more user typing habits based on the contact detected, wherein the user typing profile is updated to incorporate data that the most probable key was not touched, thereby using the one or more user typing habits to modify the virtual keyboard.

32. The system of claim 29, wherein the operations further include:

operating and managing data from the sensor.

33. The system of claim 29, wherein the sensor utilizes wedge optics technology.

34. The system of claim 29, wherein selectively updating the predetermined key configuration data corresponding to the fastest moving finger based on the contact detected comprises:

determining whether the fastest moving finger touches a less probable key instead of the most probable key; and updating the predetermined key configuration data corresponding to the fastest moving finger in response to determining that the fastest moving finger touched the less probable key to incorporate data that the less probable key was touched.

35. The system of claim 29, wherein the operations further include:

storing finger coordinate data for the one or more fingers of the hand, and keyboard size and position data for the virtual keyboard; and determining size and position of the virtual keyboard on the touch screen display based on the keyboard size and position data for the virtual keyboard.

36. The system of claim 29, wherein the sensor is under the touch screen display and is able to detect finger movements above the touch screen display.

* * * * *